(No Model.) 2 Sheets—Sheet 1.

W. A. HORRALL.
COTTON PLANTER.

No. 286,700. Patented Oct. 16, 1883.

WITNESSES
F. L. Durand
J. R. Littell

W. A. Horrall
INVENTOR
by
Andrew & Co.
Attorneys.

(No Model.) 2 Sheets—Sheet 2.

W. A. HORRALL.
COTTON PLANTER.

No. 286,700. Patented Oct. 16, 1883.

UNITED STATES PATENT OFFICE.

WILLIAM A. HORRALL, OF WASHINGTON, INDIANA, ASSIGNOR OF ONE-HALF TO WILLIAM H. FARRIS, OF SAME PLACE.

COTTON-PLANTER.

SPECIFICATION forming part of Letters Patent No. 286,700, dated October 16, 1883.

Application filed July 16, 1883. (No model.)

*To all whom it may concern:*

Be it known that I, WILLIAM A. HORRALL, a citizen of the United States, residing at Washington, in the county of Daviess and State of Indiana, have invented a new and useful Cotton-Planter, of which the following is a specification, reference being had to the accompanying drawings.

This invention relates to machines for planting cotton-seed, &c.; and its object is to provide a machine possessing superior advantages in point of simplicity, convenience in operation, durability, and general efficiency.

Figure 1:
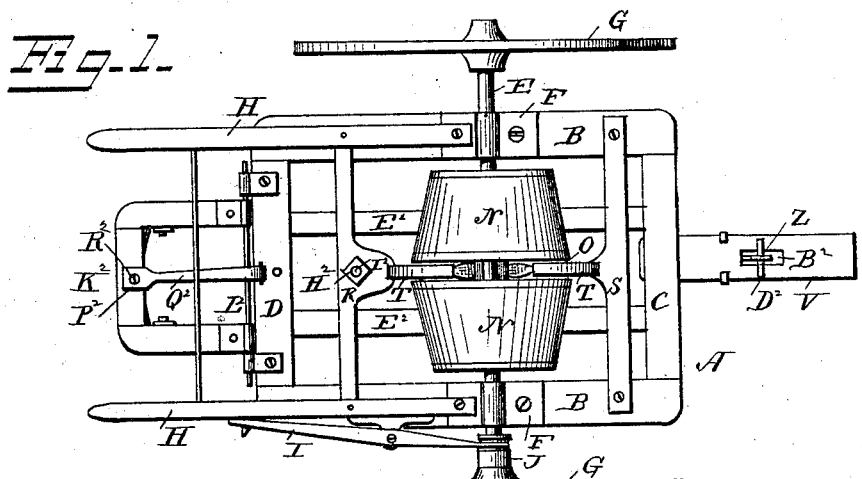
Figure 2:
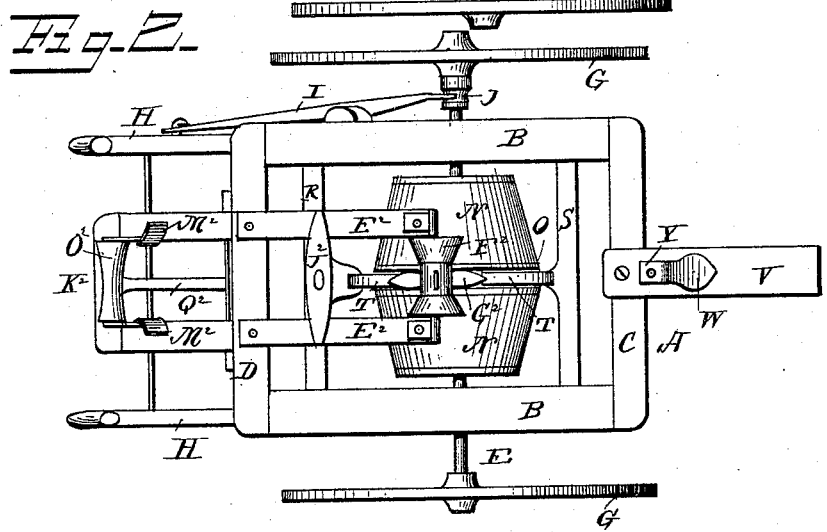
Figure 3:
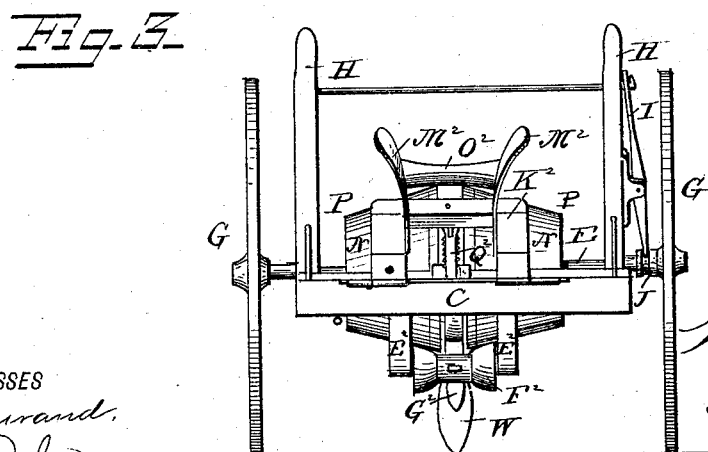
Figure 4:
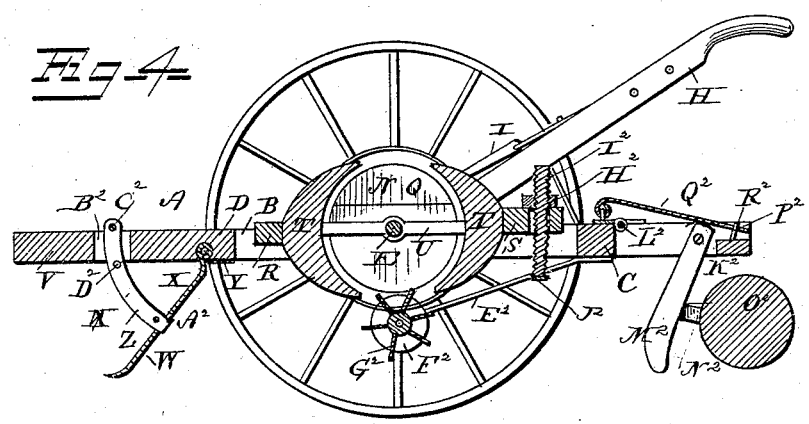
Figure 5:
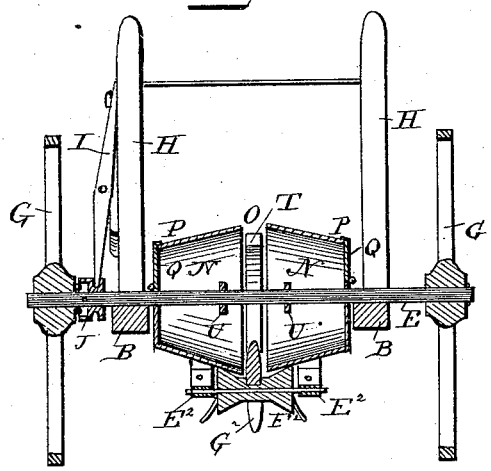
Figure 6:
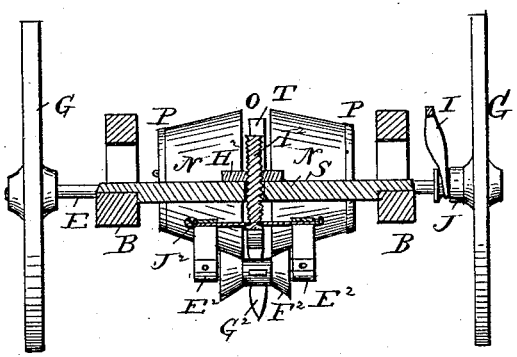
Figure 7:
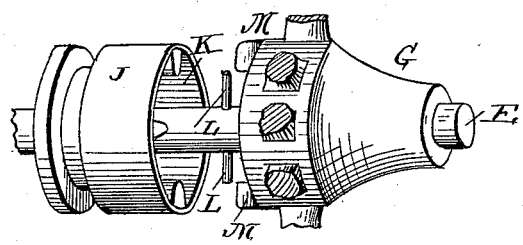

In the drawings, Figure 1 is a top view of the machine. Fig. 2 is a bottom view of the same. Fig. 3 is a rear end view with the coverer-frame thrown up out of operating position. Fig. 4 is a vertical longitudinal sectional view. Fig. 5 is a vertical transverse sectional view taken on the line of the axle of the machine, and looking rearwardly. Fig. 6 is a vertical transverse sectional view taken through the adjusting-screw, and looking forwardly. Fig. 7 is a detail view of the clutch mechanism.

Referring to the drawings, A designates the main frame of the machine, which is preferably rectangular in form, and comprises the longitudinal side beams, B B, the front cross-beam, D, and the rear cross-beam, C.

E is the rotary axle, which has its bearings F F about centrally on the beams B B, and carries the wheels G G, which are arranged to turn on the axle. The handle-beams H H are connected with the beams B B, and on one of the handles is fulcrumed a lever, I, that engages a clutch-collar, J, that is arranged to slide on the axle by operation of the said lever, and is provided with a series of radial recesses, K, in its outer face, that first receive radial pins L L, projecting from the axle, to lock the clutch from rotary movement on the latter, and then receive lateral pins M M on the hub of the wheel, to lock the latter to the axle and cause the same to turn with the wheel. A rotary movement can thus be imparted to the axle during operation of the machine.

The seed receptacle or box is fixed to the axle, and is arranged to rotate therewith. It is formed of two separate cylindrical half-sections, N N, having open inner adjoining ends, and arranged on the axle, so that a seed-space, O, will be left between these inner ends. The outer ends, P, of these sections N N are closed, and are preferably provided with a hinged door, Q, through which the seed can be placed in the box.

R is a transverse beam secured to beams B B in front of the seed-box, and S is a corresponding beam arranged in rear of said box. These beams are provided with vertically-disposed centrally-projecting fingers or plates T T, one being on each beam, that are segmental, to correspond to the shape of the seed-box sections N N, and project into the space O between the latter, to prevent the seed from accidentally falling from the sections. In the sections N N of the seed-box, and at their inner ends, are arranged transverse braces U U, that are secured to the axle and effect a stirring of the cotton-seed during the revolution of the seed-boxes.

V is a beam projecting forwardly from the front beam, D, and having the opener W hinged to its under side, as shown at X, the said opener being formed with a rearwardly-projecting plate, Y, that comes against the beam and limits the downward swing of the cultivator or blade. A segmental brace, Z, is hinged to the face of the cultivator, as shown at $A^2$, and passes up through a slot, $B^2$, in the beam V, and is retained in the slot by a cross-pin, $C^2$, inserted in any one of a series of perforations, $D^2$, in the brace.

From the rear side of the rear beam, C, extend two forwardly-projecting flat springs, $E^2$ $E^2$, between which and to their front ends is journaled a roller, $F^2$, that is forced against the sections N N of the seed-box by the springs, and is provided with a central series of radial fingers, $G^2$, that extend up between the sections N N and feed the seed from the same. It will be understood that as the seed-box revolves with the axle the friction of the seed-box with the roller $F^2$ will turn the latter in a direction opposite to the revolution of the sections N N. The pressure of the roller against the said sections N N is regulated by the tension of the spring, which latter is easily adjusted by operating a nut, $H^2$, on a screwthreaded stem, I², that works through the beam S, and carries a transverse plate, J², at its lower end, which plate comes under the springs and acts on the same.

K² is a frame, which is hinged, as shown at L², to the rear beam, C, and carries the coverers M² M², from which latter project rear arms, N², between which is journaled a transverse concaved roller, O², that serves to even the ground after the passage of the coverers. This frame can be thrown up onto the main frame when it is out of operation, and is locked down in position during operation by engaging the perforated end P² of a hinged rod, Q², that extends from the beam C over a pin, R², on the frame K².

The operation and advantages of my invention will be readily understood. It is very simple, and its parts are easily adjustable in relation to each other, while its operation is efficient and can be conveniently governed.

I claim as my invention—

1. The combination of a rotary axle, seed-boxes secured thereon, and comprising cylindrical sections with a space between, supporting-springs, and a roller journaled on the ends of these springs and held against the seed-box by the tension of the same, so that it will be operated by friction with the rotary seed-box, the said roller being provided with fingers that project up between the sections of the seed-box, substantially as and for the purpose set forth.

2. The combination of the frame of the machine, a rotary axle, the seed-box arranged on the axle, and comprising the cylindrical half-sections disposed with the space between, the transverse beams arranged in front and rear of the seed-box, and carrying the segmental arms or plates that close the opening between the sections of the seed-box, and a roller arranged under the latter and provided with radial teeth projecting up between the same, substantially as and for the purpose set forth.

3. The combination of the frame of the machine, the axle adapted to rotate, the seed-box secured on the axle, and comprising the cylindrical half sections, having closed outer ends and open inner adjoining end, and disposed with the space between their inner adjoining ends, the transverse beams arranged in front and rear of the seed-box, and provided with the segmental arms that project into the space between the sections of the seed-box, the flat springs projecting from the frame under the box, and the roller journaled at the ends of these springs and held against the sections of the rotary seed-box by the tension of the same, and provided with the radial teeth, substantially as and for the purpose set forth.

4. The combination of the axle having the radial pins L, the wheel arranged to turn on the end of the axle, and provided with the laterally-projecting pins M, and the clutch-collar adapted to slide on the axle, and provided with the series of radial recesses K in its face to receive the pins L and M, substantially as and for the purpose set forth.

5. The combination, with a rotary seed-box, of a roller held against the same, so as to be operated by the friction and to feed the seed from the box, flat springs carrying the said roller, and mechanism for adjusting the tension of the springs, substantially as and for the purpose set forth.

In testimony that I claim the foregoing as my own I have hereto affixed my signature in presence of two witnesses.

WILLIAM A. HORRALL.

Witnesses:
 THOS. B. LAYCOCK,
 N. H. JEPSON.